US008437454B2

(12) United States Patent
Turner

(10) Patent No.: US 8,437,454 B2
(45) Date of Patent: May 7, 2013

(54) METHOD AND SYSTEM FOR RECORDING AN AUDIO MESSAGE

(75) Inventor: Gerry Turner, Long Beach, CA (US)

(73) Assignee: VoiceCards, Inc., Long Beach, CA (US)

( * ) Notice: Subject to any disclaimer, the term of this patent is extended or adjusted under 35 U.S.C. 154(b) by 538 days.

(21) Appl. No.: 12/721,066

(22) Filed: Mar. 10, 2010

(65) Prior Publication Data

US 2011/0222674 A1 Sep. 15, 2011

(51) Int. Cl.
*H04M 1/64* (2006.01)
*H04M 11/00* (2006.01)

(52) U.S. Cl.
USPC ........................................... 379/88.22; 379/88.13

(58) Field of Classification Search ..... 379/88.17–88.22
See application file for complete search history.

(56) References Cited

U.S. PATENT DOCUMENTS

| | | | | |
|---|---|---|---|---|
| 4,969,136 A * | 11/1990 | Chamberlin et al. | ...... | 369/29.01 |
| 5,172,404 A * | 12/1992 | Hashimoto | ................ | 379/88.18 |
| 5,444,767 A * | 8/1995 | Goetcheus et al. | ........... | 379/67.1 |
| 5,648,760 A * | 7/1997 | Kumar | .......................... | 340/4.4 |
| 5,708,627 A * | 1/1998 | Gormley | ........................ | 368/10 |
| 5,719,920 A | 2/1998 | Harman | | |
| 5,826,235 A | 10/1998 | Harman | | |
| 6,356,626 B1 * | 3/2002 | Ohara et al. | ................ | 379/88.22 |
| 6,718,013 B2 * | 4/2004 | Turner et al. | ................ | 379/88.07 |
| 7,203,287 B2 * | 4/2007 | Turner et al. | ................ | 379/88.07 |
| 7,292,681 B2 * | 11/2007 | Pines | .......................... | 379/88.28 |
| 7,376,564 B2 * | 5/2008 | Selg et al. | ...................... | 704/272 |
| 7,434,735 B2 * | 10/2008 | Dean et al. | ..................... | 235/487 |
| 7,535,996 B2 | 5/2009 | Turner | | |
| 7,634,068 B1 * | 12/2009 | Flammer | ..................... | 379/88.23 |
| 7,770,802 B2 * | 8/2010 | Dean et al. | ..................... | 235/487 |
| 7,815,108 B2 * | 10/2010 | Schacherer et al. | ........... | 235/380 |
| 7,841,538 B2 * | 11/2010 | Robertson et al. | ............. | 235/492 |
| 7,866,550 B2 * | 1/2011 | Clegg et al. | ..................... | 235/380 |
| 7,871,013 B2 * | 1/2011 | Schumann et al. | ............. | 235/492 |
| 7,903,797 B1 * | 3/2011 | Flammer | ..................... | 379/88.23 |
| 7,946,977 B2 * | 5/2011 | Klearman et al. | ............... | 600/38 |
| 8,019,451 B2 * | 9/2011 | Smith et al. | ..................... | 700/94 |
| 2005/0163291 A1 * | 7/2005 | Turner | ......................... | 379/88.17 |
| 2010/0175287 A1 * | 7/2010 | Gupta et al. | ................ | 40/124.01 |
| 2011/0088293 A1 * | 4/2011 | Mason | ........................ | 40/124.03 |
| 2011/0119967 A1 * | 5/2011 | Kawesch | ..................... | 40/124.03 |

\* cited by examiner

*Primary Examiner* — Joseph T Phan
(74) *Attorney, Agent, or Firm* — Fulwider Patton LLP

(57) ABSTRACT

The system and method of the present invention allows a customer to contact a vendor in person at a vendor's store or via a telephone or online through an internet connection to the vendor's computer for the purpose of adding a personalized voice message to a gift. The customer is directed to the vendor's computer which instructs the customer through a series of record-playback-rerecord-save commands until the customer's message is captured by the vendor's computer in a digital format. The voice message is saved in an audio file such as a .wav or .mp3 file and tagged with a unique identifier assigned by the system and associated with a unique order. The vendor can then download the audio message from the computer to a greeting card, gift, or the like using a direct connection from the computer to a small playback unit manufactured into the card, gift, or the like. The direct connection can be a USB cable, or other suitable connection between the computer and the playback device. The card, gift, or the like with the playback device incorporated therein and the sender's message downloaded into the playback device is delivered to the recipient, who can then activate the playback device such as by manual pressure on a button to play the customer's greeting.

12 Claims, 4 Drawing Sheets

METHOD AND SYSTEM FOR RECORDING AN AUDIO MESSAGE

FIELD OF THE INVENTION

The present invention relates to recording and playback of personalized audio messages. More particularly, the present invention relates to the devices and methods employed in recording a personalized greeting onto a voice message playback device to be sent to a recipient along with a card, gift or other product.

BACKGROUND OF THE INVENTION

As modern conveniences have increased, so have the pace of life and the distances between loved ones, friends and business associates. People have become more transient, and a truly global marketplace has emerged. Due to the rapid technological advancements of recent years and the associated changes in how people conduct their personal and business affairs, the general public's interest in buying and obtaining products and information remotely has increased significantly. On a personal level, many people now buy gifts through long distance telephonic retail services or over the internet. As a result, a gift giver may never see or touch the gift, which is typically sent directly from a warehouse or retail store directly to the intended recipient. There is virtually no opportunity for the gift giver to add a "personal touch" to the gift of any kind. In the business world, it is often the case that products or information are sent to a customer directly from a third-party supplier without a truly personal touch from the sending party. For example, sending flowers from a recipient in one city to a recipient in another city. For businesses to gain and keep customers in today's competitive marketplace, a personal touch may be the deciding factor. Therefore, in both the personal and the commercial context, it is often desirable to provide a custom, personalized voice message with a gift, product or other information being sent to a recipient.

To this end, several voice message recording systems have been contemplated in the art. For example, U.S. Pat. Nos. 5,719,920 and 5,826,235 disclose a system for remote recording of a personal audio greeting as compressed, digital data onto a "communication package." With this system, the greeting is stored in the programming device, or "unitized interface system," and then provided to the communication package as compressed, digital data; thereby necessitating that the circuitry of both the unitized interface system and the communication package contain components needed to transmit and store this compressed, digital data, causing the system to be relatively more complex, expensive and physically larger.

Other examples of voice message recording systems known in the art include U.S. Pat. No. 5,063,698, which proposes that a customer's personal audio message be recorded from an answering machine onto a separate voice chip, or read-only memory device, that would then be inserted into a greeting card having the balance of the electronics for playback of the message pre-installed in the card, while U.S. Pat. No. 5,444,767 proposes that the entire voice message playback circuitry be pre-installed in a greeting card, ornament, stuffed animal, or the like. Thus, with these systems, all or a portion of the voice message playback circuitry is pre-installed in the card, gift or product being sent to a recipient, causing these systems to be bulky, inflexible and less adaptable to the needs of individuals and businesses alike.

The present inventor's U.S. Pat. Nos. 7,203,287 and 7,535,996 set forth solutions to the problems of the prior art by using a hardware based recorder/imprinter to transfer voice messages from a sender using a handset, telephone line, or internet onto a voice module. The voice module with the sender's voice message is then inserted into a gift or card, allowing the recipient to hear the sender's voice message along with the accompanying gift, card, etc. However, while these devices have experienced commercial success, the present inventor has discovered that there are issues with a hardware-based solution such as the recorder/imprinter that pose difficulties when, say, updates are needed. With hundreds or thousands of units located throughout the country, this represents a major expenditure of time and resources. Accordingly, the present invention seeks to overcome that problem.

SUMMARY OF THE INVENTION

The present invention provides for an economical, convenient and easy-to-use audio message recording and playback system that eliminates the need for a hardware based recorder/imprinter unit. The system instead relies on a software based solution that can record and store audio messages in a memory and then load that audio message directly into a playback unit built into the card, gift, or the like. The software based system allows a customer to contact a vendor in person at a vendor's store or via a telephone or online through an internet connection to the vendor's computer. The vendor can take the customer's order information and assign a unique identifier to the customer's order and information. The customer can then provide a delivery address or other instructions in connection with a recipient if the gift or card is to be delivered, and then the vendor can transfer the customer to a computer-driven system using a handset in the store, transfer the telephone call to the vendor's computer via proprietary software, or direct the user to a separate link on its home page to acquire the voice message. The vendor's computer directs the customer through a series of record-playback-rerecord-save commands until the customer's message to the recipient is satisfactorily captured by the computer in a digital format from the customer's voice across the phone line or microphone on the customer's computer. The voice message is saved in an audio file such as a .wav or .mp3 file and tagged with a unique identifier assigned by the system and associated with a unique order. The vendor can then download the audio message from the computer to a greeting card, gift, or the like using a direct connection from the computer to a small playback unit manufactured into the card, gift, or the like. The direct connection can be a USB cable, or other suitable connection between the computer and the playback device. The card, gift, or the like with the playback device incorporated therein and the sender's message downloaded into the playback device is delivered to the recipient, who can then trigger the playback device such as by manual pressure on a button to play the customer's greeting.

Alternatively, the customer's information and voice message file is communicated electronically by the vendor via the internet or other means to another, remote vendor or retailer, where the customer's order can be filled at a location more proximate with the recipient (such as with flowers, chocolates, perishables, or for other reason). The remote retailer receives the customer's audio message on its computer and then downloads the audio message from its computer to a card, gift or the like with a built-in playback device using the method described above.

Other features and advantages of the invention will become apparent from the following detailed description, taken in conjunction with the accompanying drawings, which illustrate, by way of example, the features of the invention.

DETAILED DESCRIPTION OF THE INVENTION

Figure 1:
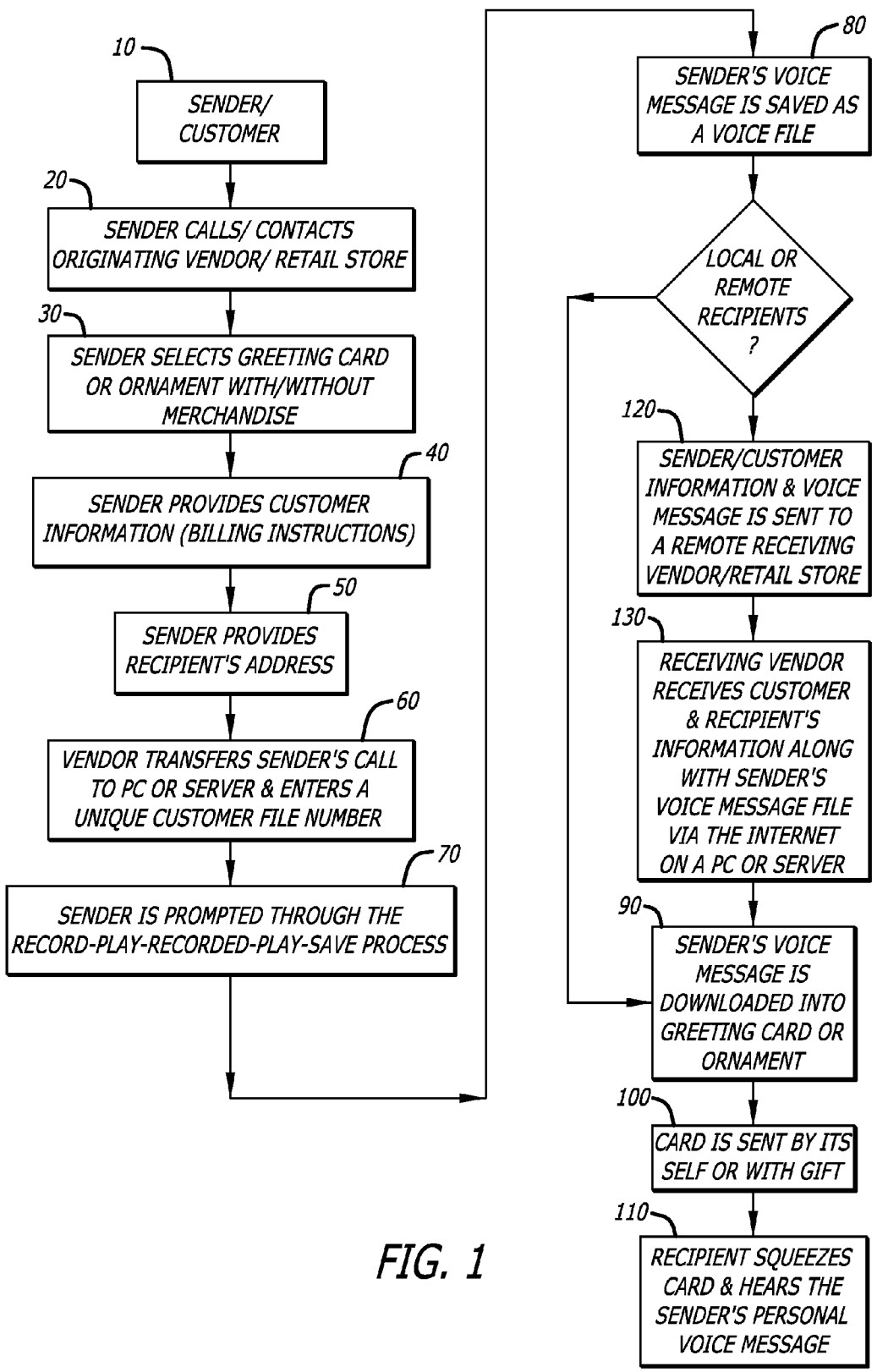
FIG. 1 is a flow diagram of a first embodiment of the present invention.

The present invention causes data stored in a client database to be accessed by the system and allows the system to identify customer orders and voice recordings that are to accompany those orders. Using the customer database, the customer is led through a process of recording messages for each order item, or alternatively applying a single message to all items in the order. As each message is recorded, the system moves to the next item and repeats the process, including asking if the last message is to be reused with the next item. As each message is recorded, the data from the customer record is stored in a separate database along with the electronic file of the recorded message. The database is then accessed when the card or gift is to be shipped, and the audio message is downloaded directly into the card or gift using a coupling such as a USB connection to a small playback device incorporated into the card or gift.

The system preferably uses two databases. A first database is defined internally and consists of an Access 2000 database having two tables. The second database is taken from the client database of customer orders. The customer database is accessed via an ODBC interface that allows the client to be in any of a number of database formats. The SQL statement used to access the data in this database can be changed at installation to allow for such requirements as aliasing names to allow for the difference in naming conventions between the client and the system of the present invention.

The customer database may be complex or straightforward. From the viewpoint of the present invention, however, one table is preferably accessible that gathers the data together about each order. The system requests an order number from a customer over the phone or a web connection, and this "key" is used to access the orders database to obtain a list of all items within the supplied order number.

The Order table of the customer database is defined as shown in the table below. The table can be defined within the customer database with the fields shown, but aliases can be used in the fields so that the code in the system does not have to be changed to accommodate different formats, etc. The access technique used can be ODBC with a DSN of "VCCustomer." This table is defined in the ODBC definitions.

| Field Name | Type | Description |
| --- | --- | --- |
| OrderNbr | Decimal/18 | This is the order number |
| SEQNbr | Long Integer | A number unique within each number used to guarantee repeatability of the order rows in a particular order |
| RecordingRequired | Yes/No | A Boolean indicator whether item has a requirement for a recording to be made |
| OrderName | Text/50 | The name of the person who placed the order |
| OrderAddr1 | Text/50 | Address line 1 of the person who placed the order |
| OrderAddr2 | Text/50 | Address line 2 of the person who placed the order |
| OrderCity | Text/50 | City of the person who placed the order |
| OrderState | Text/50 | State of the person who placed the order |
| OrderZip | Text/50 | Zip code of the person who placed the order |
| OrderPhone | Text/50 | Phone number of the person who placed the order |
| Ship2Nbr | Long Integer | A unique number identifying the ship to number |
| Ship2Name | Text/50 | Name of the recipient of the order |
| Ship2Addr1 | Text/50 | Address line 1 of the recipient of the order |
| Ship2Addr2 | Text/50 | Address line 2 of the recipient of the order |
| Ship2City | Text/50 | City of the recipient of the order |
| Ship2State | Text/50 | State of the recipient of the order |
| Ship2Zip | Text/50 | Zip code of the recipient of the order |
| Ship2Phone | Text/50 | Phone number of the recipient |
| CardType | Text/50 | Card type to be used for this order |
| MassRcrd | Yes/No | Indicator if all items using single recording |
| CardTime | Long Integer | Duration allowed for the recording time for specific card. Only referenced if the SysInfo switch identifies that the recording duration is to be taken from the Customer OrderItems database table. A blank or zero value will result in the default value being used. |

The SQL statements used to obtain a recordset of this table are:

Case 1: SELECT*FROM Orders Where OrderNbr=<caller info>

ORDER By OrderNbr, SeqNbr

Case 2: SELECT*FROM Orders Where OrderNbr=<caller info>

AND RecordingRequired=TRUE

ORDER By OrderNbr, SeqNbr

The first portion of the SQL statement (bolded) is definable at installation to the system, allowing the table to be given a different name within the database and also allowing aliasing to be specified in the interface between the system and the client database.

The system's internal database consists of two tables—"SysInfo" and "VCIData" or an audio file such as .wav or .mp3. The SysInfo table contains parameters used to alter the system's operation for various options. The VCIData contains records that are generated by the system based on contact, either telephone calls, Internet, or other means, directed to it. For each item from the Orders table in the customer database that requires a recording, a record may be generated in the VCIData table.

The SysInfo table contains information that is used to specify options to the system. Exemplary fields within this table are shown below.

| Field Name | Type | Description |
|---|---|---|
| XXXCommand | Memo | Contains a partial SQL statement like "SELECT . . . FROM . . ." and should include aliasing to make sure that the field names defined in the test database are recognized. The statement stored here will have an appropriate selection criteria added to it |
| DbgVal | Long Integer | Contains a number that specifies the level of debug output to be generated by the system. |
| RecordFormat | Long Integer | Stores the format for recording messages. 0 = 8K (for example) 8 bit PCM, 3 = 6K 4 bit OKI ADPCM. Default value is 3. |
| HelpNbr | Text/50 | Help Line number |
| RecordingDuration | Long Integer | Maximum length of recording |
| RecDurFromCust | Yes/No | Boolean variable used to determine the source of the recording limit for an individual recording session. |

The variables above are read into the system from the database table at the start of the program so that if a change is made, the system must be restarted for the change to take effect.

The VCIData table stores and passes the result of each recording session to the equipment that transfers the message to the chips in the cards or other items. Sample fields for this table are shown below.

| Field Name | Type | Description | Source |
|---|---|---|---|
| OrderNbr | Decimal/18 | This is the order number | Customer Database |
| SEQNbr | Long Integer | A number unique within each number used to guarantee repeatability of the order rows in a particular order | Customer Database |
| RecordDateTime | Date/Time | Date and Time of creation of record in the VCIData table | System |
| OrderName | Text/50 | The name of the person who placed the order | Customer Database |
| OrderAddr1 | Text/50 | Address line 1 of the person who placed the order | Customer Database |
| OrderAddr2 | Text/50 | Address line 2 of the person who placed the order | Customer Database |
| OrderCity | Text/50 | City of the person who placed the order | Customer Database |
| OrderState | Text/50 | State of the person who placed the order | Customer Database |
| OrderZip | Text/50 | Zip code of the person who placed the order | Customer Database |
| OrderPhone | Text/50 | Phone number of the person who placed the order | Customer Database |
| Ship2Nbr | Long Integer | A unique number identifying the ship to number | Customer Database |
| Ship2Name | Text/50 | Name of the recipient of the order | Customer Database |
| Ship2Addr1 | Text/50 | Address line 1 of the recipient of the order | Customer Database |
| Ship2Addr2 | Text/50 | Address line 2 of the recipient of the order | Customer Database |

-continued

| Field Name | Type | Description | Source |
|---|---|---|---|
| Ship2City | Text/50 | City of the recipient of the order | Customer Database |
| Ship2State | Text/50 | State of the recipient of the order | Customer Database |
| Ship2Zip | Text/50 | Zip code of the recipient of the order | Customer Database |
| Ship2Phone | Text/50 | Phone number of the recipient | Customer Database |
| CardType | Text/50 | Card type to be used for this order | Customer Database |
| RecDuration | Long Integer | Total time in seconds of the recording | System |
| RecStatus | Long Integer | Current Status of Recording: 0 = newly created 1 = Processed by the burner 2 = Canceled by an external program | System, Burner, or Other |
| VoiceData | OLE Object | Voice data suitable for copying into a .wav file or .mp3 file. | System |

The main program flow is to answer an incoming call and request an order number from the caller. The order number is used to open a recordset from the customer database maintained by the client. This recordset should contain all the rows of data for the order number specified. If the recordset is empty, the caller or vendor is told that the order number provided is invalid and is given further opportunities to re-enter a valid order number. Once a valid order number is given, the recordset is obtained again but this time containing only those records that are marked as requiring a message recording. If there are no records in the recordset, the caller or vendor is told that there are no items in his/her order that require a message and is given further opportunity to enter an order number.

Once a recordset is obtained that has records in it that require recordings, the caller or vendor is provided instructions to complete each record with a request to confirm that the item being processed is correct by reporting the item number in the order and providing a spelling of the recipient. Once the caller or vendor has confirmed the records, the caller is given directions on how to record his/her audio message. After the first recording, the system asks the caller if the previous message is to be used or if a new message is to be recorded. Once all items have been recorded, the caller is informed that the proceeding is completed and the system ends the call.

FIG. 1 is a flow chart illustrating the general steps taken by the system. The first box 10 represents the customer or sender of the object to be delivered or gifted. The customer initiates contact with the vendor in step 20, such as through an in-person visit to a retail store, a telephone call to the vendor's store, or a visit to the vendor's internet web page. The sender then selects a greeting card, gift, ornament, or the like from the vendor's selection of deliverable goods at step 30. At this point, the vendor takes the customer's information such as billing information (step 40), special instructions, delivery instructions and information (step 50), and any other customer information necessary to complete the transaction.

Once the customer's information has been acquired by the vendor, the customer is transferred to a computer such as a personal computer ("pc") running a proprietary software. If the customer is calling the vendor from a telephone, the call is rerouted to the computer. If the customer is personally present in the vendor's establishment, the customer may be directed to a station where the computer can instruct the customer. If the customer is at the vendor's website, the website can transfer the user to the vendor's computer where the software is operating. When the customer is transferred to the vendor's computer, the unique customer identifier is also sent to the computer and coupled with the customer's to-be-created audio message at step 60. The software guides the customer through a series of steps that allow the customer to enter an audio message for the recipient that will accompany the delivery. The audio message is spoken by the customer into a telephone handset, computer microphone, or local receiver and captured by the vendor's computer. The customer is prompted to speak the message, confirm or re-record the message, and save the message once it is completed at step 70.

Once the message is captured and confirmed by the customer, it is saved in the computer's memory in a digital format along with the customer's unique identifier in step 80. If the recipient of the gift and message is local to the vendor or to be delivered by the vendor, the audio file is downloaded from the computer's memory into a greeting card, ornament, gift or the like in step 90. Here, the gift or card is manufactured with a playback device that can be accessed by the computer, such as by a USB cable or other cable and jack/port. The playback device can be used to convert the digital file of the customer's voice message into an audio signal that can be delivered to a built-in speaker. The card or gift is then delivered to the recipient with the playback device loaded with the customer's message in step 100. Once received, the gift can play the customer's message for the recipient by actuating the playback device in step 110, such as by squeezing a button on the playback device. If the recipient is remote to the vendor or the loading of the audio message is to be conducted elsewhere from the vendor's computer, the vendor can send the customer's instructions, information, and audio file (step 120) via the internet or other electronic data transfer mechanism to a remote computer of a distributor, second vendor, or the like where it is received and processed as above (step 130). The remote vendor or distributor then proceeds as set forth above in steps 90 through 110 to download the audio message into a playback device and deliver the product to the recipient.

Figure 2:
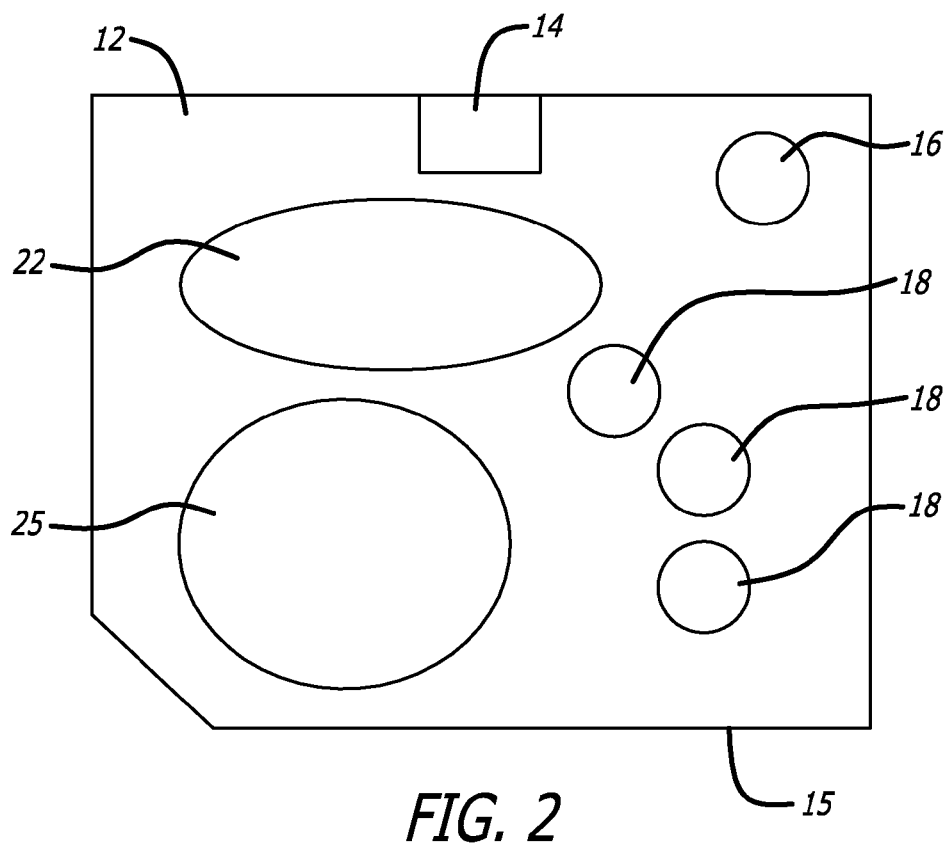
FIG. 2 is a schematic view of a voice module that can be incorporated into a deliverable gift or card.
Figure 3:
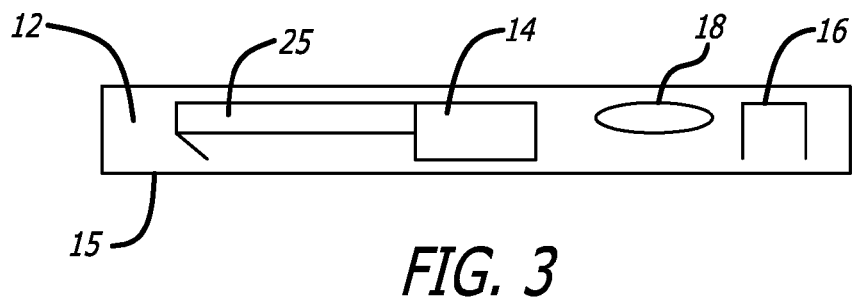
FIG. 3 is a side view of the voice module of FIG. 2.

FIGS. 2 and 3 illustrate a sample playback device 15 in plan and side view, respectively. The playback device is formed on a printed circuit board 12 that includes memory storage 22 that can store and retrieve the digital audio information stored therein in a .wav or .mp3 file format. The playback device includes batteries 18 and an activation switch 16 that initiates the playback of the message through the speaker 25. The playback device also preferably includes a port 14 or other jack such as a USB type connector that allows the audio message to be transferred from the vendor's computer to the card or gift's playback device as set forth in step 90 of FIG. 1.

Figure 4:
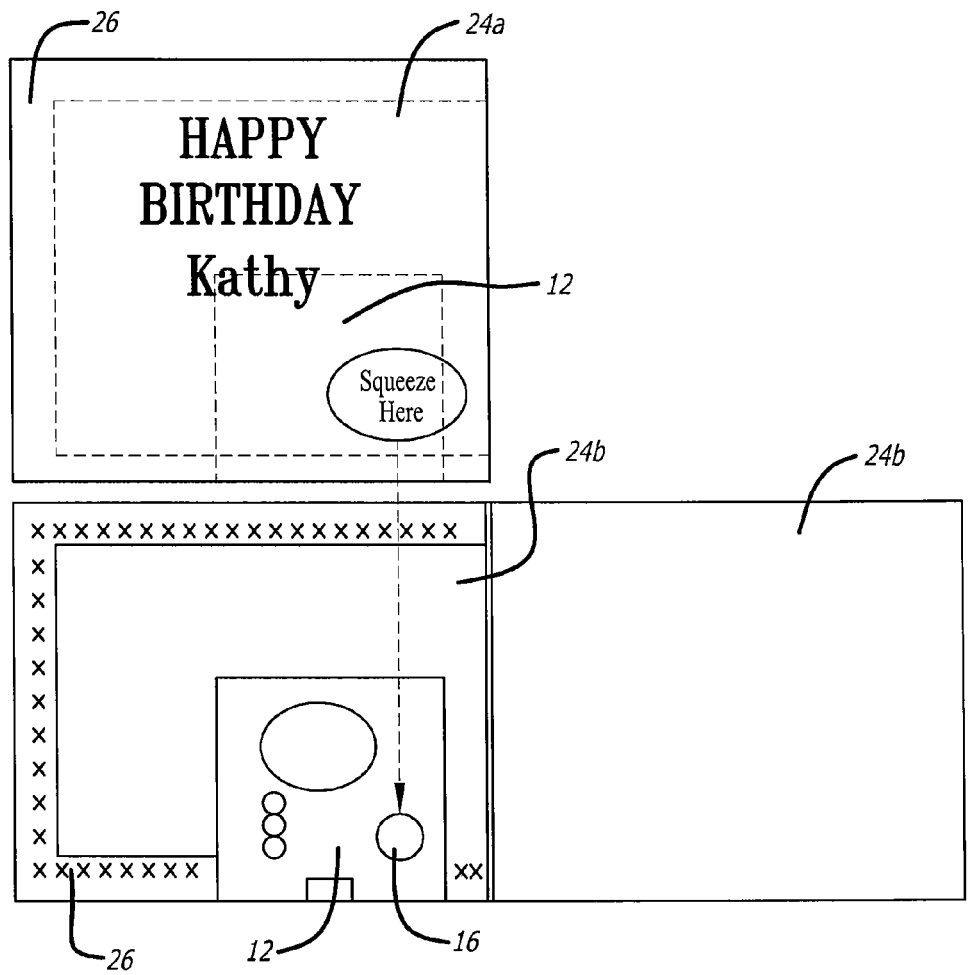
FIG. 4 is a diagram of a single fold greeting card with a voice module of FIG. 2.

FIG. 4 illustrates a single fold greeting card 24 that can be used with the present invention. On a front surface of the card 24a is graphics or a theme such as "Happy Birthday" along with space for the recipient's name (e.g., "Kathy") and a brief note or message. The playback device 12 is glued or otherwise secured to the inside surface 24b of the card such that the playback device 12 is enclosed between the opposed inner halves 24b by folding the card about the centerline, and closed by adhesive 26 about the perimeter of the card. The card 24 can be any standard size greeting card such as five inches by seven inches, three inches by three inches, three and one half inches by five inches, or any other size as selected by the user.

Figure 5A:
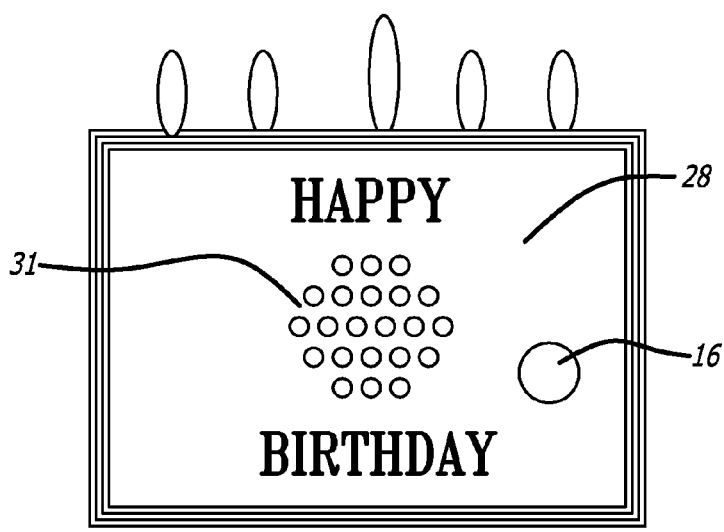
FIG. 5a-c are diagrams of a sample ornament having a voice module of FIG. 2 incorporated therein.
Figure 5B:
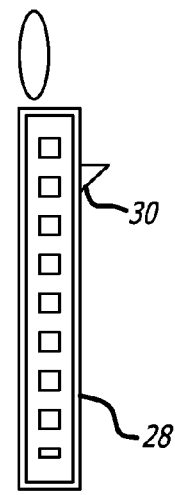
Figure 5C:
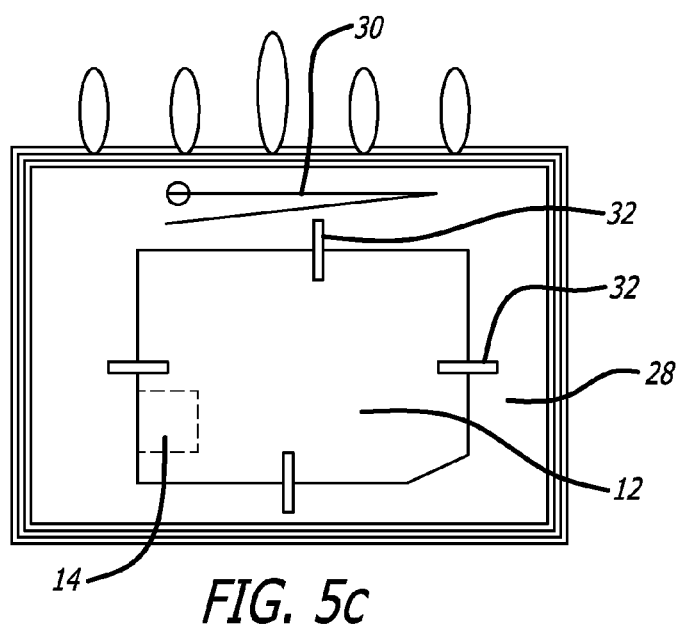

FIGS. 5a-5c illustrate a sample ornament of the type that can be used with the present invention, here a pin 28 in the shape of a birthday cake. The ornament 28 can be a standalone gift or can accompany another gift such as a box of chocolates or fresh flowers. The ornament 28 can be made from a stiff material such as plastic and have an opening in the back for a playback device 12. The front face of the ornament 28 could be made of a thin material with holes 31 to allow the pre-recorded audio message to be transmitted by the speaker 25 therethrough. The activation button 16 is preferably visible from the front face and invites the wearer/recipient to depress the button so that the playback device can play the customer's audio message. The ornament can take the form of a broach pin 30 on the back to allow the ornament to be worn on clothing. Fasteners 32 can be used to secure the playback device 12 to the back of the ornament.

It will be appreciated by those skilled in the art that since the voice module is small and is a completely self-contained audio playback device, it can accompany a virtually unlimited number of cards, gifts, products and other packages. The versatility thus accorded the use of the voice module makes the audio message system of the present invention optimally configured for a wide variety of applications, even on a small budget.

Various modifications and changes may be made with regard to the foregoing detailed description without departing from the spirit of the invention.

I claim:

1. A method for incorporating a recorded voice message with an accompanying delivery item comprising:
   taking and storing customer's delivery and billing information;
   transferring control of the transaction to a computer for capturing an audio message from the customer from a telephone or internet connection;
   assigning a unique identifier to the transaction by the computer;
   initiating record and save instructions to record an audio message from the customer to a recipient;
   storing the audio message and unique identifier on a vendor's computer;
   using the unique identifier to download the customer's audio message into a playback device manufactured in delivery item selected by the customer; and
   delivering the delivery item to the recipient using the delivery information obtained from the customer.

2. The method for incorporating a recorded voice message of claim 1 further comprising transferring the audio message and unique identifier to a remote vendor prior to downloading the audio message into a playback device, where the downloading occurs at the remote vendor.

3. The method for incorporating a recorded voice message of claim 1 further comprising inserting the playback device into a broach pin.

4. The method for incorporating a recorded voice message of claim 1 further comprising inserting the playback device into one of a greeting card and a business card.

5. The method for incorporating a recorded voice message of claim 1 where the taking and storing customer's delivery and billing information occurs over the telephone.

6. The method for incorporating a recorded voice message of claim 1 where the taking and storing customer's delivery and billing information occurs in a vendor's store.

7. The method for incorporating a recorded voice message of claim 1 where the taking and storing customer's delivery and billing information occurs over the internet.

8. The method for incorporating a recorded voice message of claim 1 where downloading of the customer's audio message to the playback device uses a USB connection.

9. The method for incorporating a recorded voice message of claim 1 wherein the recipient plays the audio message from the customer by depressing a portion of the delivery item.

10. The method for incorporating a recorded voice message of claim 4 wherein the greeting card is designed to hold the playback device therein with a single fold.

11. The method for incorporating a recorded voice message of claim 4 wherein the greeting card is designed to hold the playback device therein with a multiple fold.

12. A system for sending a voice message in a card or deliverable comprising:
- means for taking and storing customer's delivery and billing information;
- means for transferring control of the transaction to a computer for capturing an audio message from the customer from a telephone or internet connection;
- means for assigning a unique identifier to the transaction by the computer;
- means for initiating record and save instructions to record an audio message from the customer to a recipient;
- means for storing the audio message and unique identifier on a vendor's computer; and
- means for using the unique identifier to download the customer's audio message into a playback device manufactured in delivery item selected by the customer.

* * * * *